May 31, 1955     E. O. TINSLEY ET AL     2,709,620

AUTOMOBILE ARM REST

Filed March 18, 1955

INVENTORS
EVERETT O. TINSLEY
THOMAS J. MORGAN
BY

Edward M. Apple
ATTORNEY

United States Patent Office 2,709,620
Patented May 31, 1955

2,709,620

AUTOMOBILE ARM REST

Everett O. Tinsley and Thomas J. Morgan, Detroit, Mich.; said Tinsley assignor to said Morgan Application March 18, 1955, Serial No. 495,295

2 Claims. (Cl. 296—49.2)

This invention relates to arm rests and has particular reference to an arm rest suitable for use on the door of an automobile.

An object of the invention is to generally improve devices of the character indicated and to provide an arm rest which is simple in construction, economical to manufacture, and one which may readily be mounted on the door of an automobile and be easily removed and stored in the glove compartment or elsewhere when not in use.

Another object of the invention is the provision of an arm rest which may be collapsed into a comparatively small space for storage and transportation.

Another object of the invention is to provide an arm rest which is provided with novel attaching means, whereby it may be secured to an automobile door without the necessity of drilling holes or otherwise marring the interior finish of the car.

Another object of the invention is to provide an arm rest for an automobile, which is adapted for use on any conventional automobile and is readily adjustable for different positions to accommodate persons of different size.

The foregoing and other objects and advantages of the invention will become more apparent as the description proceeds, reference being made from time to time to the accompanying drawings, forming part of the within disclosure, in which drawings.

Figure 1:
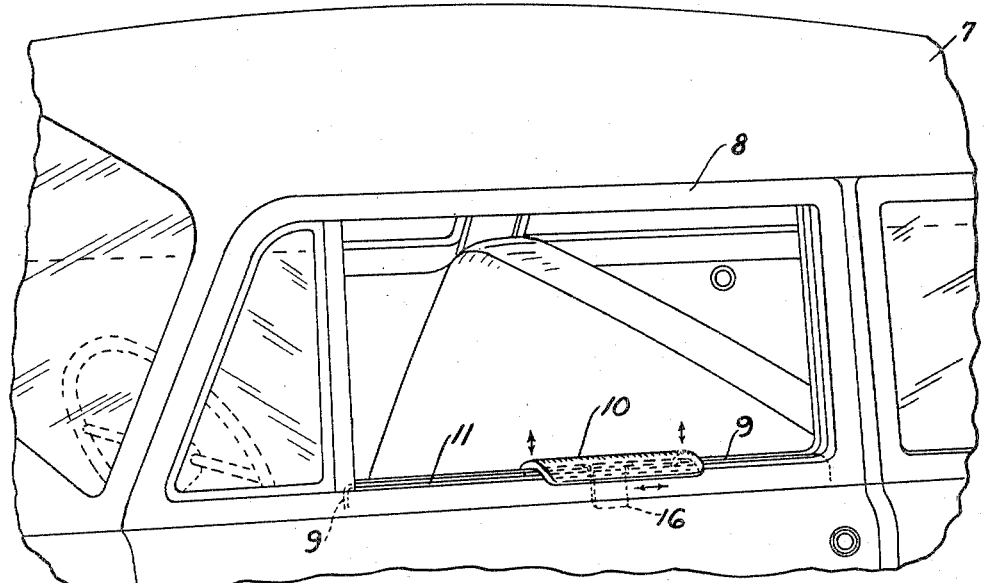
Fig. 1 is a perspective view of a portion of an automobile body showing the device embodying the invention mounted on one of the doors.
Figure 2:
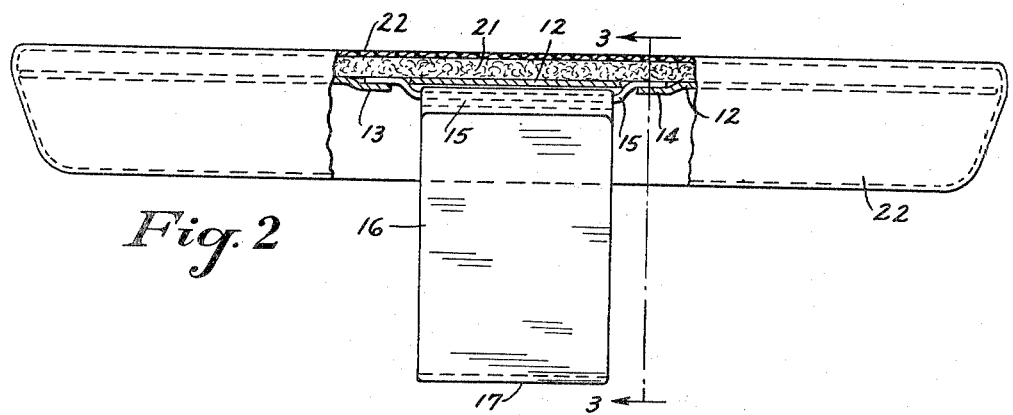
Fig. 2 is an enlarged elevational view of the arm rest detached from the vehicle body and with parts broken away to illustrate the relative position of other parts.

Referring now more particularly to the drawings, it will be understood that in the embodiment herein disclosed, the reference character 7 indicates the body of a vehicle having a door 8 which is provided with a conventional window opening, which is normally closed by the window glass 9 which, as shown in Fig. 1, is in lowered position. The device embodying the invention is generally indicated by the reference character 10 and is designed to be mounted on the lower member 11 of the window frame.

Figure 3:
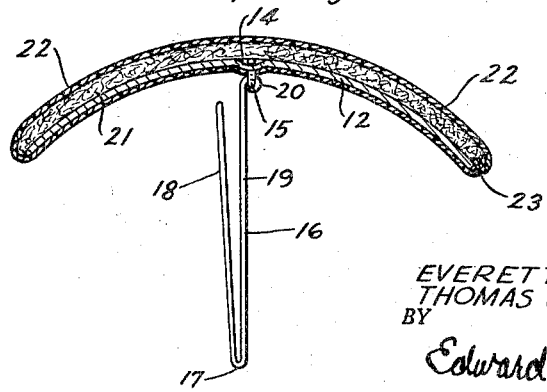
Fig. 3 is a vertical section taken on the line 3—3 of Fig. 2.

The arm rest 10 consists of a plate 12 which is convexly curved as shown in Fig. 3, and which is lanced, as at 13 and 14, to provide ears which serve as supports for the ends of a rod 15, on which is mounted the attaching member 16, which in this embodiment consists of a flat spring element which is bent, as at 17, to provide a snub nose which is readily insertable between one of the frame members 11 and the lowered door glass 9. The legs 18 and 19 of the attaching member 16 diverge from the snub nose bend 17 and because of their springiness, exert outward pressure against the frame member 11 and the door glass 9 to prevent displacement of the arm rest when it is in position for use.

The member 16 also serves the purpose of preventing the door glass 9 from rattling in the door when it is in lowered position as shown in Fig. 1 and permits the arm rest to be moved longitudinally on the frame members 11 to any suitable position to accommodate persons of different size. The member 16 is preferably sprayed with a plastic or other suitable material which is soft and would not tend to scratch the window glass 9 or other parts of the door with which it comes in contact. The attaching element 16 is secured to the rod 15 by rolling the upper end of the leg 19 over the rod 15 as shown at 20, Fig. 3.

The plate 12 is preferably padded with a suitable padding material 21 and the plate and padding are preferably covered with cloth or leather 22 which is preferably stitched as at 23. When the device is not in use as shown in Fig. 1, the fastening member 16 may be folded against the bottom of the covered plate 12, so that the device may be readily carried in a glove compartment or the like.

Having described our invention what we claim and desire to secure by Letters Patent is:

1. A detachable arm rest for an automobile, comprising a curved plate having a padding thereon, said plate having a pair of ears downwardly lanced substantially on its longitudinal median line, a rod having end members engaging said ears, and a flat spring member pivotally secured to said rod, said spring member being bent near its center to form a pair of divergent arms.

2. The structure of claim 1, in which said flat spring member is pivoted only at one end, and there is a snub nose formed at the bend of said flat spring member to insure easy insertion of said spring between two other members.

References Cited in the file of this patent

UNITED STATES PATENTS

| 2,586,631 | Esch | Feb. 19, 1952 |
| 2,601,052 | Ortleb | June 17, 1952 |
| 2,670,235 | Susil | Feb. 23, 1954 |